United States Patent
Rappoport (12)

(10) Patent No.: US 6,495,637 B2
(45) Date of Patent: Dec. 17, 2002

(54) WATER-COMPATIBLE URETHANE-CONTAINING AMINE HARDENER

(75) Inventor: Leonid Rappoport, Mountain View, CA (US)

(73) Assignee: 3L & T, Inc., Mountain View, CA (US)

( * ) Notice: Subject to any disclaimer, the term of this patent is extended or adjusted under 35 U.S.C. 154(b) by 2 days.

(21) Appl. No.: 09/791,532

(22) Filed: Feb. 22, 2001

(65) Prior Publication Data

US 2001/0008924 A1 Jul. 19, 2001

Related U.S. Application Data

(62) Division of application No. 08/876,998, filed on Jun. 16, 1997, now Pat. No. 6,218,480.

(51) Int. Cl.$^7$ .......................... C08G 18/06; C08G 18/00
(52) U.S. Cl. ...................... 525/459; 525/450; 525/454; 525/523; 525/528; 528/73; 528/85; 528/370; 528/405
(58) Field of Search ................................ 525/459, 450, 525/454, 523, 528; 528/73, 85, 370, 405

(56) References Cited

U.S. PATENT DOCUMENTS

| | | | | |
|---|---|---|---|---|
| 4,401,499 A | | 8/1983 | Kaneko et al. .......... 156/370.3 |
| 5,175,231 A | | 12/1992 | Rappoport et al. .......... 528/106 |
| 5,707,741 A | * | 1/1998 | Hoenel et al. .............. 428/413 |
| 5,994,479 A | * | 11/1999 | Green et al. ............. 428/423.1 |
| 6,077,929 A | * | 6/2000 | Pardoen et al. ............. 525/523 |

* cited by examiner

Primary Examiner—Robert Dawson
Assistant Examiner—Jeffrey B. Robertson
(74) Attorney, Agent, or Firm—Lumen Intellectual Property Services, Inc.

(57) ABSTRACT

A formulation to produce urethane linkages reacts cyclocarbonate groups with diamines. Aliphatic polyhydroxyl precursor molecules are first epoxidized. The invention does not require complete epoxidation, as it makes use of the un-epoxidized hydroxyl groups of the precursor molecule. These hydroxyl groups are combined with isocyanate groups of prepolymer molecules to form urethane links. The use of prepolymers increases the networking, flexibility, and impact-resistance of the final product. The known formulations for amine hardeners also require complete carbonation of the epoxy groups to form reactive cyclocarbonate groups, which are reacted with diamines to form an amine hardener. In the proposed invention, both cyclocarbonate and epoxy groups are used to combine with the different diamine molecules by making use of the different reactivities of aliphatic, cycloaliphatic, and aromatic amine groups. This procedure not only increases the networking in the final polyurethane, it ensures that there are enough reactive amines to form the amine hardener. In addition, the resulting urethane contains hydroxyl groups which impart water-compatibility. The amine hardener can then be combined with any commercial epoxy resin to form a polyurethane that is water-compatible, non-toxic, has a low viscosity, and a high degree of penetrance into a surface, and after curing is impact-resistant, abrasion-resistant, chemical-resistant, strong, and flexible.

14 Claims, 5 Drawing Sheets

WATER-COMPATIBLE URETHANE-CONTAINING AMINE HARDENER

RELATED APPLICATIONS

This application is a divisional of application 08/876,998 filed on Jun. 16, 1997, now U.S. Pat. No. 6,218,480.

FIELD OF THE INVENTION

This invention relates generally to polyurethane formulations. More particularly, it relates to a water-compatible urethane-containing amine hardener which produces a polyurethane when combined with an epoxy resin.

BACKGROUND OF THE INVENTION

Polyurethanes are high molecular weight compounds which have a high degree of strength, hardness, and friction resistance. They are often used as adhesives, cements, and coatings. They are made of polymers which contain repeating urethane groups, as shown in FIG. 1.

Traditionally, polyurethanes may be produced by reacting diols with di-isocyanates, as shown in FIG. 3. U.S. Pat. No. 4,401,499 by Kaneko et. al discloses a method for producing a resin which reacts molecules containing hydroxyl groups with di-isocyanates to form temporary urethane polymers, which are noted for their stability and strength. Isocyanates, however, are highly toxic, non-stable substances because they react easily with water, such as moisture in the air. This method of producing polyurethane cannot be used in many applications, namely those involving direct contact with water.

U.S. Pat. No. 5,175,231 by Rappoport, incorporated herein by reference, describes a method for producing water-compatible polyurethanes which involves reacting oligomeric cyclocarbonates with diamines. This method begins with aliphatic polyepoxy molecules, which are used as precursors for cyclocarbonate-containing molecules. An example is Heloxy 84® produced by Shell Chemical Company. This product contains several epoxy functional groups. Since a desirable polyurethane coating comprises molecules attached to each other in a non-dissipated, three-dimensional network, it is preferable to have a precursor containing as many multi-functional epoxy groups as possible. However, the aliphatic polyepoxy molecules normally contain a number of residual hydroxyl groups that were not converted to epoxy groups, as epoxidation of aliphatic molecules is never 100% efficient due to the nature of the reaction commonly used. As a result, there are fewer epoxy groups available than desired, thus reducing the number of cyclocarbonate groups and possible links in the future polyurethane network. Although it is possible to increase the percentage of epoxy groups, it is more expensive and technically difficult to reach comprehensive epoxidation of aliphatic hydroxyl-containing compounds such as Heloxy 84®.

In Rappoport's method, the epoxy functional groups of Heloxy 84® are reacted with carbon dioxide to produce cyclocarbonate functional groups. The reaction is shown in FIG. 2. This reaction is also less than 100% efficient, leaving some epoxy groups unreacted. Like the residual hydroxyl groups mentioned above, these unreacted epoxy groups reduce the functionality of the urethane molecule and as a consequence, the number of links in the final polyurethane network. Typically, the conversion rate of epoxy groups to cyclocarbonate groups is only about 80–85% efficient at the soft conditions before "sticking" of the carbonation reaction occurs. In order to achieve comprehensive carbonation, a more extreme version of the reaction must be carried out. The temperature is raised from 100° C. to 130° C., the reaction time is increased from 1–1.5 hours to 5–6 hours, and a larger amount of catalyst, usually quaternary ammonium salts, is used. Though this reaction ensures that nearly all the epoxy groups have been turned into cyclocarbonate groups, it also produces undesirable side reactions and products. In addition, it is more expensive and time-consuming.

After the formation of cyclocarbonate functional groups, the molecules are reacted with diamines, such as Vestamine IPD (isophorone diamine) and Vestamine TMD (trimethyl hexamethylene diamine), both made by Hüls America, Inc. The reaction is shown in FIG. 4. These diamines contain two amine groups with different reactivities. For the isophorone diamine, the aliphatic amine groups are the more reactive amines, while the cycloaliphatic amine groups are the less reactive amines. The more reactive aliphatic amines are usually used to react with the cyclocarbonate groups of the molecules, thus forming urethane links. The less reactive cycloaliphatic amines are left unreacted. The urethane links form the basis for the urethane-containing amine hardener. The amine hardener is usually packaged and stored until it is time to create the polyurethane.

In order to create the polyurethane, the urethane-containing molecules of the amine hardener containing the unreacted less reactive cycloaliphatic amines are combined with an epoxy resin. These less reactive cycloaliphatic amines react with the epoxy resin to form the polyurethane. The polyurethane is then cured as a result of the hardener's multifunctionality. Unfortunately, because all the more reactive amine groups have previously reacted, there is often a shortage of less reactive amine groups in the curing stage which leaves the reaction incomplete and weakens the structure of the final polyurethane.

In many epoxide resin-amine hardener formulations, reactions are carried out in the presence of organic solvents, which are volatile air pollutants and sometimes carcinogenic. These organic solvents also decrease the reactivity of the functional groups, thus reducing the degree of cross-linking.

OBJECTS AND ADVANTAGES OF THE INVENTION

Accordingly, it is the primary object of the present invention to improve the efficiency and lower the cost of amine hardener formulations and to overcome problems due to the incomplete epoxidation and carbonation reactions. It is another object of this invention to provide a variety of amine hardeners by formulating different combinations of the necessary structural units, which also allows control over the properties of the polyurethane to be produced. It is another object of the invention to remove hazardous components from the presence of polyurethane users at the final processing stage. Another object of the invention is to produce a superior polyurethane formulation, which is water-compatible, non-toxic, has a low viscosity, and has a high degree of penetrance into a surface (mainly porous) before curing, and is impact-resistant, abrasion-resistant, chemical-resistant, strong, and flexible after curing. It is a final object of the invention to provide a one-package polyurethane formulation, whereby the urethane-containing amine hardener and epoxy resin can be packaged together for a certain amount of time without reacting until needed.

SUMMARY OF THE INVENTION

These objects and advantages are attained by an improved urethane-containing amine hardener synthesis. Precursor aliphatic polyepoxies, such as Heloxy 84®, contain a plurality of epoxy functional groups, as well as residual hydroxyl functional groups that were not converted to epoxy groups at the time of the Heloxy 84® synthesis from polyepoxy molecules. The proposed formulation for amine hardener synthesis makes use of the unconverted hydroxyl groups by reacting them with isocyanate groups on a prepolymer molecule to form a urethane-containing molecule. Although this reaction contains hazardous components, it is achieved under the supervision of specialists in sealed chemical equipment. Polyurethane users are not exposed to any chemical hazards.

As a result of the above modification, the epoxy-containing molecules bearing the mentioned hydroxyl groups are combined together by use of the prepolymer molecule. Consequently, the common functionality of the mixture is increased and a more complete, non-dissipated, three-dimensional network can be created at the curing stage. As is described in the known method, the epoxy groups are reacted with carbon dioxide to form cyclocarbonate groups. If this reaction is carried out at the more soft conditions, it is 80–85% efficient, thus leaving some epoxy groups unconverted. The proposed formulation for amine hardeners is able to make use of the unreacted epoxy groups by taking advantage of the different reactivities of diamine molecules, cyclocarbonate molecules, and epoxy molecules. Aliphatic amines have a high reactivity to both cyclocarbonate and epoxy functional groups, as shown in FIGS. 5 and 6. Cycloaliphatic amines have a lower reactivity but are still able to react with both cyclocarbonate and epoxy functional groups, as shown in FIGS. 7 and 8. Aromatic amines are the least reactive, as they are only able to react with epoxy functional groups, as shown in FIG. 9, but not with the cyclocarbonate groups. Thus, selectively reacting the aromatic amine groups with the unconverted epoxy groups on the urethane molecule renders them functional, but does not affect the cyclocarbonate groups. This reaction produces functional amine-containing molecules which are indifferent to cyclocarbonate groups at the ambient temperature, so that the two can coexist. However, after the addition of the epoxy resin to form the final polyurethane, the aromatic amines will be able to participate in the curing process.

The different reactivity of the amines is also used in the final stage of urethane-containing amine hardener synthesis. Modified diamines are used instead of the "virgin" ones used in the known method. By blocking the more reactive aliphatic amine groups of the isophorone diamine with a ketone, thus forming an amino-ketoxime, as shown in FIG. 10, it is possible to allow the less reactive cycloaliphatic amine groups to react with the cyclocarbonate functional groups first.

Interior urethane links are formed in this way. These molecules are stable and can be kept for a certain amount of time until the polyurethane is produced, due to the "hidden" more reactive aliphatic amine groups. These molecules also contain "hidden" hydroxyl groups near the urethane links which impart water-compatibility to the final hardener as a result of the urethane reaction.

To produce the final amine hardener which can react with an epoxy resin, the more reactive aliphatic amine groups must be deprotected. This is easily achieved with hydrolysis by water to remove the ketones. The regenerated more reactive aliphatic amine groups can then react with the epoxy functional groups of the epoxide resins. Any commercial aromatic epoxy resin may be used. In addition, the resulting amine hardener may be used in combination with other commercial polyamine hardeners such as di-ethylenetriamine or amino-amides to form amine hardeners with different characteristics.

The final amine hardener can be combined with an epoxy resin to form an especially water-compatible formulation which possesses impact-resistance, abrasion-resistance, chemical-resistance, strength, and flexibility after curing. This non-toxic polyurethane has a low viscosity and a high degree of penetrance into a surface, and as such can be used to coat, protect, and repair concrete, cement, wood, gypsum, and other porous surfaces. It can also be used for impregnation and reinforcement. Other uses include water-diluted coatings for wood and water-borne adhesives for silicate materials. Curing can take place at the ambient temperature. Polyurethane coatings produced by this invention are especially strong and flexible, due to the incorporation of the prepolymer molecules which form additional links in the final network, as well as increasing the functionality of the amine hardener.

In addition, the ability of this invention to make use of all three cyclocarbonate, epoxy, and hydroxyl functional groups not only increases the number of links in the final complete network, but also reduces time and cost factors in the synthesis of urethane-containing amine hardeners and the processing of amine hardener-epoxy resin formulations.

DETAILED DESCRIPTION

Figure 1:
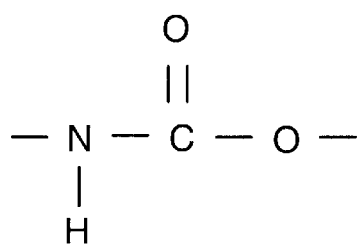
FIG. 1 shows the chemical structure of a urethane link.
Figure 2:
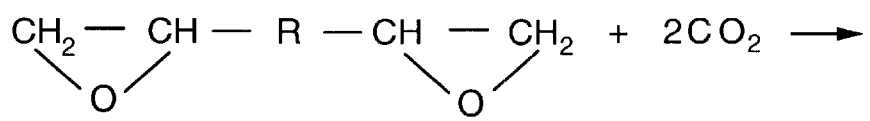
FIG. 2 is a reaction diagram between an epoxy group and carbon dioxide to produce a cyclocarbonate-containing molecule.
Figure 2:
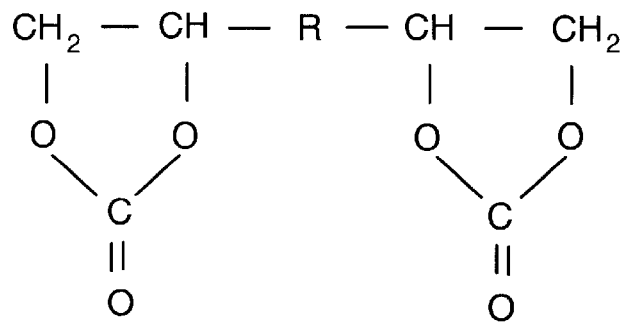

The proposed formulation for a urethane-containing amine hardener to be combined with an epoxy resin to form a polyurethane begins with an aliphatic polyepoxy precursor molecule that typically has not been completely epoxidized. This molecule may contain any number of both epoxy and hydroxyl functional groups. Examples of such a molecule include Heloxy 84® from Shell Chemical Company, or any other epoxy-containing polyether typically having molecular weight 500–2000, functionality of 2.5–4.0, and containing 10–20% residual hydroxyl groups after incomplete epoxidation of corresponding polyhydroxylated precursors. The following steps are then carried out:

I. The epoxy functional groups of the aliphatic polyepoxy precursor molecules are reacted with carbon dioxide to form cyclocarbonate functional end groups, as shown in FIG. 2. Reaction conditions are roughly at a temperature of 110° C. for 1–1.5 hours, with the addition of a catalyst, usually quaternary ammonium salts. Under these reaction conditions, complete carbonation of the epoxy groups will not occur, so some epoxy groups will remain unreacted. Efficiency is estimated at 80–85%. The resulting product contains both unconverted epoxy and hydroxyl functional groups.

Figure 3:
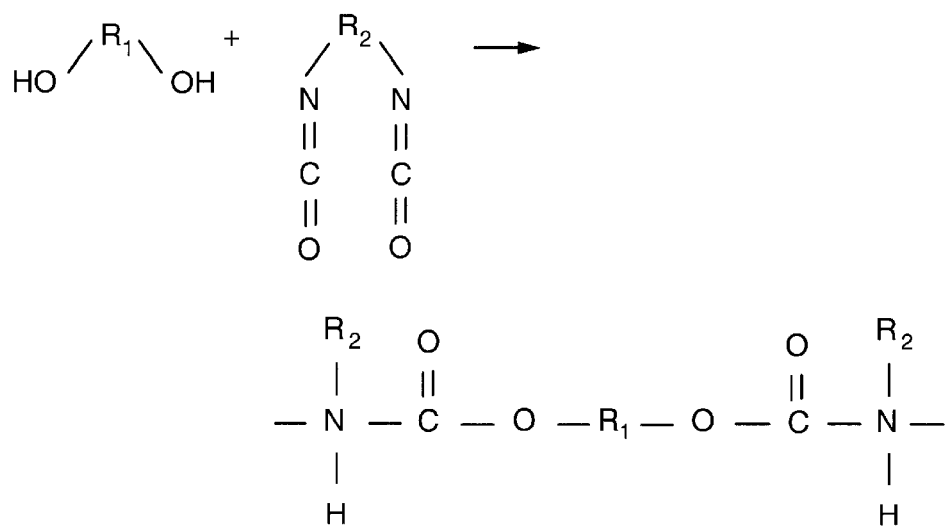
FIG. 3 is a reaction diagram between an oligodiol and a di-isocyanate to form a polyurethane. This is the known method.
Figure 4:
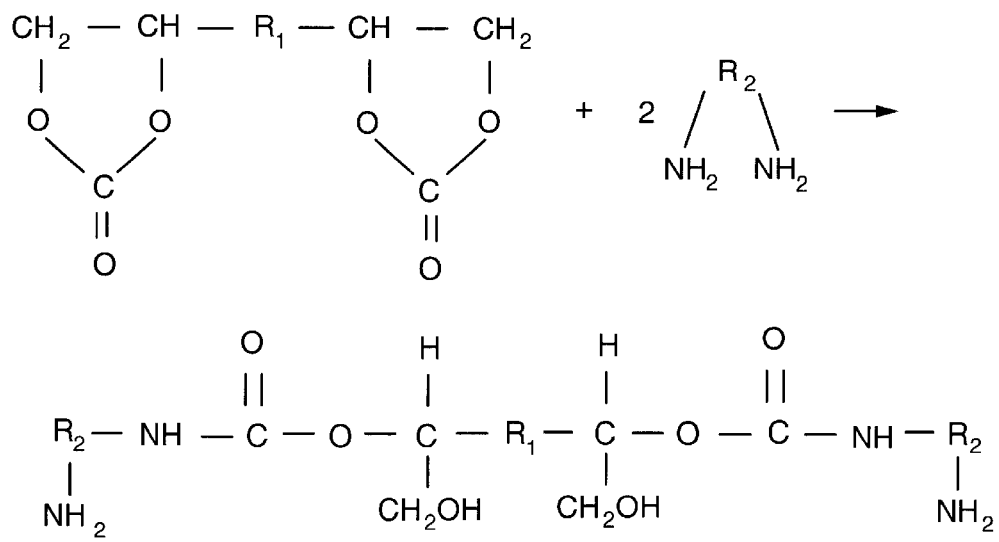
FIG. 4 is a reaction diagram between a cyclocarbonate group and a diamine molecule to form a water-compatible, hydroxyl-containing polyurethane without the use of di-isocyanates.

II. The residual hydroxyl functional groups of the cyclocarbonate-containing intermediates are combined with isocyanate groups of isocyanated prepolymer molecules to form urethane molecules, as shown in FIG. 3. By using prepolymer molecules with at least two isocyanate groups, it is possible to combine two hydroxyl-containing, cyclocarbonate-containing molecules, thus creating a tetra-functional urethane polymer from two bi-functional molecules. Examples of such a prepolymer molecule include any commercial polymers based on polyethers, polyesters, mixed poly (ethers-esters), or oligodienediols with molecular weight of 500–2000. This reaction is carried out using traditional polyurethane chemistry under controlled conditions by trained specialists. The polyurethane users are not in any way associated with this reaction.

III. The residual epoxy groups of the urethane molecules are made functional by combining them with aromatic diamine molecules to form amine-containing urethane molecules. Examples of such aromatic diamine molecules are methylene-bisorto-aniline and its substituted derivatives. The aromatic amines are relatively unreactive and as such, do not react with the cyclocarbonate groups. However, they participate in the reaction with the epoxy groups of the epoxy resin later on.

Figure 5:
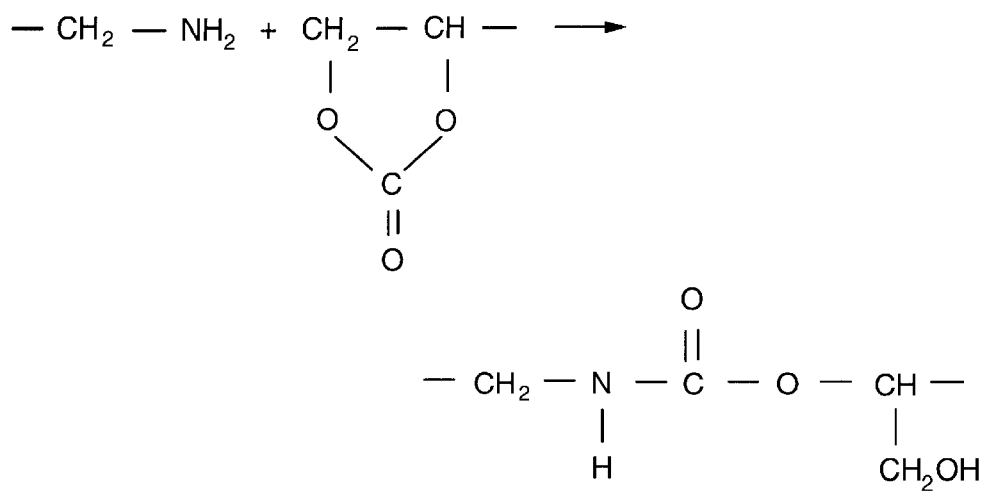
FIG. 5 is a reaction diagram between an aliphatic amine group and a cyclocarbonate group to form a urethane linkage.
Figure 6:
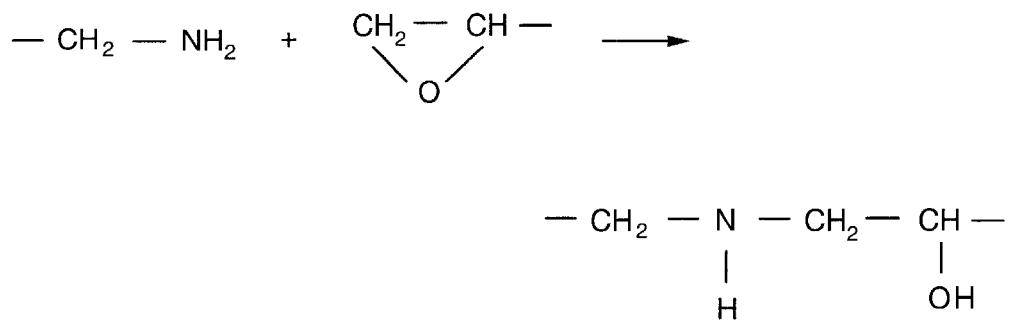
FIG. 6 is a reaction diagram between an aliphatic amine group and an epoxy group to form a secondary amine linkage.
Figure 7:
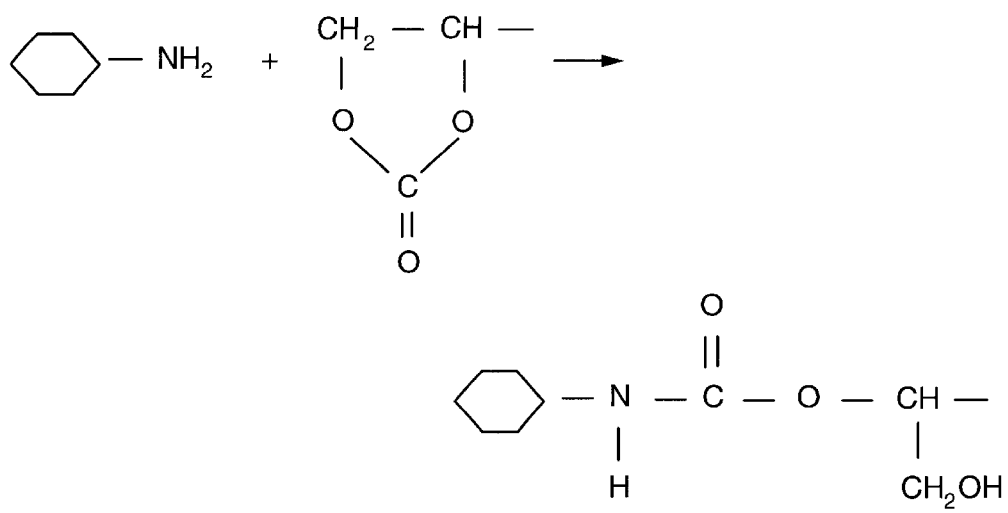
FIG. 7 is a reaction diagram between a cycloaliphatic amine group and a cyclocarbonate group to form a urethane linkage.
Figure 8:
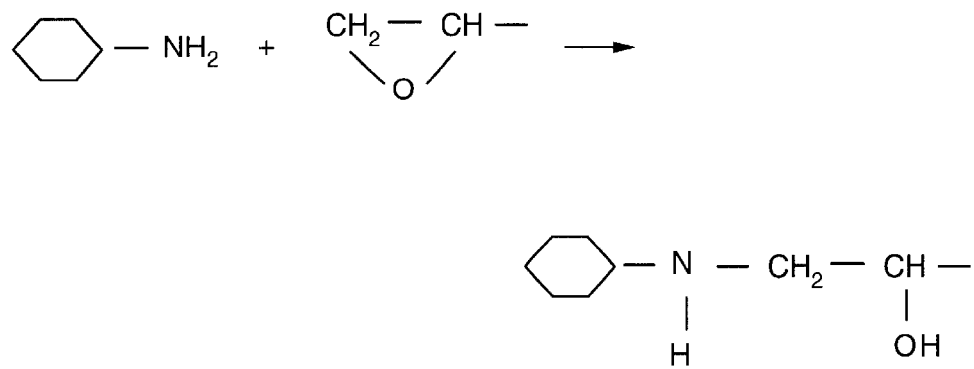
FIG. 8 is a reaction diagram between a cycloaliphatic amine group and an epoxy group to form a secondary amine linkage.
Figure 9:
FIG. 9 is a reaction diagram between an aromatic diamine and an epoxy group to form an amine-containing molecule.
Figure 9:
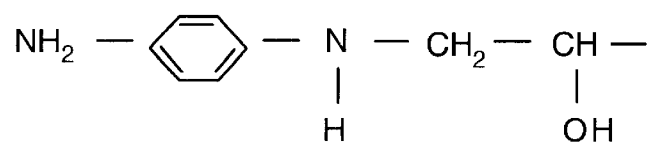
Figure 10:
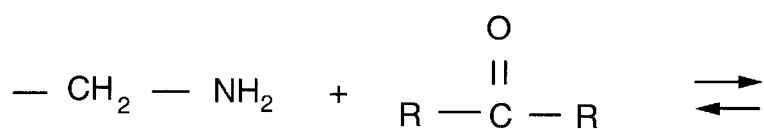
FIG. 10 is a reversible reaction diagram between an aliphatic amine group and a ketone to form an amino-ketoxime.
Figure 10:
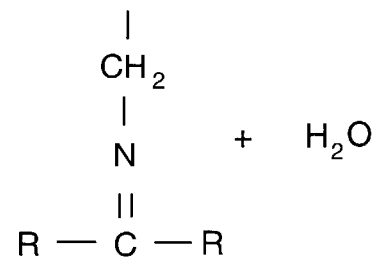

IV. At this point, the cyclocarbonate groups of the intermediate molecules are reacted with diamine molecules containing amine groups with different reactivities to form a functional amine hardener, as shown in FIGS. 5 and 7. An example of such a diamine molecule is an isophorone diamine containing more reactive aliphatic groups and less reactive cycloaliphatic groups. To create an amine hardener with increased reactivity, a preliminary modification of the diamine molecule is made. The more reactive aliphatic amine groups are protected by use of a ketone to produce an amino-ketoxime, as shown in FIG. 10. An example of such a ketone is methyl ethyl ketone. The less reactive cycloaliphatic amine groups are left unmodified.

V. The cyclocarbonate functional groups of the urethane molecules are now able to combine with the unprotected less reactive cycloaliphatic amine groups to form an amine hardener, as shown in FIG. 7. The urethane linkages produced by the reaction between the cyclocarbonate groups and the above amines contain hydroxyl groups that impart water-solubilty to the final polyurethane. The resulting urethane-containing amine hardener is stable and can be packaged and stored under dry conditions until needed.

VI. When it is time to form the final cured polyurethane, the more reactive aliphatic amine groups are regenerated, as shown in FIG. 10. The amino-ketoxime may be hydrolyzed and destroyed by addition of water. A much larger volume of water than neccesary to destroy the amino-ketoxime may be used.

VII. With the addition of an epoxy resin, this amine hardener can now form the polyurethane. Any commercial aromatic epoxy resin may be used. In addition, the resulting amine hardener may be used in combination with other commercial polyamine hardeners such as di-ethylene-triamine or amino-amides to form amine hardeners with different characteristics.

Using the method described above, it is clear that a stable, long-lasting, one-package polyurethane kit can be produced. Such a kit will contain urethane polymers produced by the described method, an epoxy resin, and a hydrolytic substance. This kit can be stored for a few days under dry conditions and then be transported to the site where the polyurethane is to be constructed.

EXAMPLES

Example 1

Polyglycidyl ether of an aliphatic polyol with a structure of polyoxypropylene, tradename Heloxy 84® (Shell Chemical Company, CAS Number 37237-76-6) having a molecular weight of 620–680 per epoxy group, with a calculated molecular weight approximately of 1700, functionality equal to 3 according to the chemical formula, with an amount of residual non-epoxidized hydroxyl groups up to 15%, is used as the main precursor for the urethane-containing amine hardener synthesis.

500 grams of the above mentioned product are loaded into a microreactor with a volume of 1 liter, provided with an effective agitator and heater. 1 gram of quaternary ammonium salt catalyst such as n-alkyl di-(methyl)-benzyl ammonium chloride (Mason Chemical Company, The Quaternary Specialists) or tetra(butyl) ammonium bromide (Zeeland Chemicals, Inc.) is added.

Dry carbon dioxide is introduced into the reactor up to a pressure of 150 lb/square inch. A temperature of 240° .F is maintained for the carbonation process.

Periodically, assays from the reactor are analyzed to estimate the decrease of epoxy groups. Their conversion into carbonate groups is calculated. After 2 hours, a conversion of 85% is reached.

Example 2

502 grams of the carbonated oligomer as described in EXAMPLE 1 are mixed with 83.6 grams of an isocyanated prepolymer with a backbone structure of poly (oxytetramethylene), molecular weight appoximately 1,000, containing 7.8% isocyanate groups, tradename Andur 75-DCP-2 (Anderson Development Company). 0.4 grams of di-butyl-di-octate of tin are added as a catalyst. The reaction between the two components is carried out at 120° F. for 2 hours until the content of isocyanate groups is close to zero.

157.4 grams of tri-methyl-hexamethylene diamine (80% solution in water), tradename Vestamin TMD (Hüls America) is mixed with the intermediate above. The reaction is carried out at 100° F. for 1 hour.

The resulting urethane-containing amine hardener has the following properties:

% amine groups: 4.8 viscosity (Brookfield, 50° F.): 800 poises (2 rpm)

The hardener can be mixed with 10% water for a transparent mixture formation.

Example 3

230 grams of the amine hardener described in EXAMPLE 2 are mixed with 100 grams of an aromatic epoxide resin with Epoxide Number 190, tradename Epon 828 (Shell Chemical Company) at the ambient temperature. 20 grams of water are added. The mixture of hardener, Epon 828, and water is transparent. It can penetrate into concrete to a depth of 2–4 mm, depending on the type of concrete.

The mixture is left at the ambient temperature for 24 hours. After the first 2 hours, the mixture begins to harden.

Testing of the hardened samples is made after 7 days. The cured polymer has the following properties:
hardness (shore A/D): 75/24
adhesion to concrete: >600 p.s.i.
tensile strength: 1400 p.s.i.
elongation at the break: 67%
flexural modulus: 4800 p.s.i.
Chemicals immersion test—% weight gain after 24 hours at 50° F.:
water: 0.8
10% sulfuric acid: 1.2
50% sodium hydroxide: 0.07
20% sodium chloride: 0.9
methyl ethyl ketone: 38.9
toluene: 18.5
mineral oil: 0.27

Example 4

124 grams of the hardener described in EXAMPLE 2 are mixed with 5.4 grams of the commercial hardener di-ethylene-triamine (DETA, BASF Corp.) and then with 90 grams of Epon 828 and 10 grams of Heloxy 48® (both from Shell Chemical Company).

After complete curing at the ambient temperature for 7 days, the final product has the following properties:
hardness (Shore D): 55
tensile strength: 1500 p.s.i.
elongation: 35%
Young's modulus: 11 k.s.i.
flexural modulus: 20500 p.s.i.

Example 5

As in EXAMPLE 4, 83 grams of urethane-containing amine hardener, 7.3 grams of DETA, and 90/100 grams of Epon 828/Heloxy 48® are combined.

The cured polymer has the following properties:
hardness (Shore D): 70
adhesion to concrete: >600 p.s.i.
tensile strength: 2700 p.s.i.
elongation: 26%
Young's modulus: 46 k.s.i.
flexural modulus: 73500 p.s.i.

Example 6

A polymer is made by mixing the same components as in the previous example, using the following masses: 46, 8.7, 90, 10.

The cured polymer has the following properties:
hardness (Shore D):82
adhesion to concrete: >600 p.s.i.
tensile strength: 4500 p.s.i.
elongation: 13%
Young's modulus: 100 k.s.i.
flexural modulus: 145000 p.s.i.

Example 7

A polymer is made by mixing the same components as in the previous example, using the following masses: 38, 9.1, 90, 10.

The cross-linked polymer has the following properties:
hardness (Shore D): 82
adhesion to concrete: >600 p.s.i.
tensile strength: 4800 p.s.i.
elongation: 15%
Young's modulus: 120 k.s.i.
flexural modulus: 170000 p.s.i.

Example 8

76 grams of the same urethane-containing amine hardener and 23 grams of the commercial hardener Jeffamine 230 (Huntsman Corp.) are reacted in combination with an epoxy mixture consisting of 90 grams Epon 828 and 10 grams Heloxy 48®.

After curing the polymer has the following properties:
hardness (Shore D): 70
tensile strength: 2630 p.s.i.
elongation: 60%
Young's modulus: 55 k.s.i.
flexural modulus: 70000 p.s.i.

Example 9

The mixture of hardeners described in the previous example consisting of 46/28 grams is used in combination with the same amount of epoxies.

The cured polymer has the following properties:
hardness (Shore D): 78
adhesion to concrete: >600 p.s.i.
tensile strength: 4000 p.s.i.
Young's modulus: 110 k.s.i.
flexural modulus: 175000 p.s.i.

Example 10

The mixture of hardeners described in the previous example consisting of 32/30 grams is used in combination with the same amount of epoxies.

The cured polymer has the following properties:
hardness (Shore D): 82
adhesion to concrete: 5500 p.s.i.
elongation: 12%
Young's modulus: 160 k.s.i.
flexural modulus: 222000 p.s.i.

Example 11

89.4 grams of carbonated Heloxy 84® made as described in EXAMPLE 1 are mixed with 14.3 grams of isocyanated prepolymer Andur-2-90 AP, molecular weight approximately 2200, containing 4.15% isocyanate groups (Anderson Development Co.)

0.06 grams of tin organic catalyst is added to the mixture. After interaction at 120° C. for 2 hours, no isocyanate groups are detected in the intermediate product. The product is then mixed with 58.6 grams of isophorone diamine (80% solution in water), tradename Vestamin IPD (Hüls America).

After 1 hour at 120° F. the hardener has a viscosity of 530 poises (at 50° F.) and contains 4.26% amine groups.

Example 12

100 grams of urethane-containing amine hardener are made according to EXAMPLE 11 and mixed with 100 grams of Epon 828 and cured at the ambient temperature.

Solidification occurs after approximately 3.5 hours.

The cured polymer has the following properties:

hardness (Shore D): 83
adhesion to concrete: >600 p.s.i.
tensile strength: 4300 p.s.i.
elongation: 15%
Chemicals immersion test—% weight gain after 24 hours, 50° F.:
water: 0.49
10% sulfuric acid: 0.8
50% sodium hydroxide: 0.23
20% sodium chloride: 0.38
toluene: 4.0
mineral oil: 0.2

Example 13

Heloxy 84® is carbonated as in the procedure described in EXAMPLE 1, but only up to 73% conversion of epoxy groups. 76 grams of the product are mixed with 11.5 grams of aromatic diamine, tradename Lonzacure M-CDEA (Lonza). After 4 hours at 160° F., analysis shows an absence of the epoxy groups.

The resulting product is reacted with 34.6 grams of Vesamin IPD (80% solution in water) at 120° F. for 2 hours.

The amine hardener has the following properties:

% amine groups: 3.5
viscosity: 530 poises

Example 14

80 grams of hardener made according to EXAMPLE 13 are mixed with 100 grams of Epon 828.

After complete curing at the ambient temperature for 7 days, the final product has the following properties:

hardness (Shore D): 80
tensile strength: 1500 p.s.i.
elongation: 35%
Young's modulus: 29 k.s.i.
flexural modulus: 7000 p.s.i.
Chemicals immersion test:
water: 0.45
10% sulfuric acid: 0.8
50% sodium hydroxide: 0.25
20% sodium chloride: 0.25
toluene: 23.0
mineral oil: 0.17

Example 15

64.7 grams of oligomer with 73% carbonation of epoxy groups is reacted with 10.2 grams of Lonzacure M-CDEA. 29.2 grams of Vestamin TMD (80% aqueous solution) are added.

The complete urethane-containing amine hardener has the following properties:

% amine groups: 3.5
viscosity: 85 poises

Example 16

A Heloxy 84® with 90% carbonation of epoxy groups is produced by using the procedure of EXAMPLE 1 with the reaction time increased to 5.5 hours. 84.7 grams of the obtained product are mixed with 14 grams of the isocyanated prepolymer Andur 2-90 AP and 0.06 grams of tin catalyst. After the isocyanate groups disappeared, 54.2 grams of Vestamin TMD (80% aqueous solution) were added and reacted according to the described conditions.

The amine hardener has the following properties:

% amine groups: 4
viscosity: 75 poises.

Example 17

100 grams of hardener made accoring to EXAMPLE 16 were mixed with 100 grams of Epon 828 and cured completely at the ambient temperature for 7 days.

The polymer has the following properties:

hardness (Shore D): 70
tensile strength: 2700 p.s.i.
elongation: 40%
flexural modulus: 44500 p.s.i.

This polymer possesses excellent stability despite UV radiation and remains colorless 6 months after exposure to sun radiation. A few commercial formulations made with Epon 828 have turned an intense yellow color under the same conditions.

Chemicals immersion test:
water: 0.6
10% sulfuric acid: 1.2
50% sodium hydroxide: 0.35
20% sodium chloride: 0.4
methyl ethyl ketoe: 28.0
toluene: 6.0
mineral oil: 0.09

Example 18

Isophorone diamine (Vestamin IPD) is reacted with methyl ethyl ketone to form an amino-ketoxime. 34 grams of the above diamine are placed in a sealed reactor under dry conditions (under argon atmosphere) and cooled to a temperature of approximately 40° F. 15 grams of methyl ethyl ketone are dosed into the diamine gradually, by separate drops, to avoid a rise in temperature. After methyl ethyl ketone dosing, the product of the reaction has been exposed to the ambient temperature for 1 hour. The urethane-containing amine hardener is synthesized under the conditions of EXAMPLE 11, but 85 grams of amino-ketoxime is used instead of the individual dosing of Vestamin IPD. This interaction requires 2.5 hours. The hardener with hidden reactive amine groups has a viscosty of 150 poises.

Example 19

105 grams of the hardener of EXAMPLE 18 are mixed with 100 grams of Epon 828. This reactive mixture is stored in a sealed vessel at ambient temperature. No essential change in viscosity is found after 3 days of storage. 2 grams of water are added to 100 grams of the reactive mixture and carefully remixed. Solidification is detected after 1 hour.

What is claimed is:

1. A method of preparing a water-compatible urethane-containing amine hardener comprising the steps of:
   a) producing cyclocarbonate-containing, hydroxyl-containing, epoxy-containing intermediate molecules by reacting carbon dioxide with aliphatic epoxy-containing, hydroxyl-containing molecules;
   b) producing urethane linked intermediate molecules by reacting said intermediate molecules with isocyanate-containing prepolymer molecules; and
   c) producing said amine hardener by reacting said urethane linked intermediate molecules with diamine molecules.

2. The method of claim 1, whereby said urethane linked intermediate molecules are produced by reacting hydroxyl groups of said intermediate molecules with said isocyanate-containing prepolymer molecules at a ratio of 1 hydroxyl group: 1 isocyanate group at 50–60° C. in the presence of 0.01–0.1% catalysts, selected from organic tin compounds or tertiary amines.

3. The method of claim 1, wherein said urethane linked intermediate molecules comprise a tetra-functional urethane polymer.

4. The method of claim 1, whereby said step a) occurs at 105–110° C. for 1–2 hours in the presence of catalysts, selected from quaternary ammonium salts amounting to 0.1–0.5% of the mass, allowing 80–85% conversion of epoxy groups to cyclocarbonate groups.

5. An amine hardener made according to the method of claim 1.

6. The method of claim 1, wherein said step c) further comprises the step of producing amine-containing urethane molecules by reacting epoxy groups of said urethane linked intermediate molecules with aromatic diamine molecules.

7. The method of claim 6 whereby said reaction is carried out at a ratio of 1 epoxy group:2 aromatic amine groups.

8. The method of claim 1, wherein said step c) further comprises the step of reacting cyclocarbonate groups of said urethane linked intermediate molecules with diamine molecules containing amine groups with different reactivities.

9. The method of claim 8, wherein said diamine molecules contain more reactive aliphatic amine groups and less reactive cycloaliphatic amine groups.

10. The method of claim 9, further comprising the step of temporarily blocking said more reactive aliphatic amine groups from being reactive by forming an amino-ketoxime with a ketone, wherein said less reactive cycloaliphatic amine groups remain reactive.

11. The method of claim 10, wherein said diamine molecules are isophorone diamine molecules or trimethyl hexamethylene diamine molecules, and said ketone is a methyl-ethyl ketone.

12. The method of claim 10, further comprising the step of producing urthane links by reacting said less reactive cycloaliphatic amine groups with cyclocarbonate groups of said urethane linked intermediate molecules.

13. The method of claim 12, wherein said step of producing urethane links uses the ratio of 1 less reactive cycloaliphatic amine group: 1 cyclocarbonate group, under dry conditions at a temperature of no more than 50° C.

14. The method of claim 10, further comprising the step of regenerating said aliphatic amine groups by reacting said amino-ketoxime with water such that said amino-ketoxime is hydrolyzed and destroyed.

* * * * *